(12) United States Patent
Haruki et al.

(10) Patent No.: US 8,830,654 B2
(45) Date of Patent: Sep. 9, 2014

(54) ELECTRONIC COMPONENT

(75) Inventors: Masayoshi Haruki, Nagaokakyo (JP); Yoshio Takeuchi, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 18 days.

(21) Appl. No.: 13/420,687

(22) Filed: Mar. 15, 2012

(65) Prior Publication Data
US 2012/0236462 A1    Sep. 20, 2012

(30) Foreign Application Priority Data

Mar. 18, 2011  (JP) ................................ 2011-061413
Feb. 22, 2012  (JP) ................................ 2012-036400

(51) Int. Cl.
*H01G 4/06*     (2006.01)
*H01G 4/228*    (2006.01)
*H01G 2/20*     (2006.01)
*H01G 4/232*    (2006.01)
*H01G 4/12*     (2006.01)
*H01G 4/005*    (2006.01)

(52) U.S. Cl.
CPC .............. *H01G 4/228* (2013.01); *H01G 4/12* (2013.01); *H01G 4/005* (2013.01)
USPC .............. 361/321.1; 361/306.1; 361/308.1; 361/308.3

(58) Field of Classification Search
USPC ................ 361/306.1, 308.1, 321.2, 308.3
See application file for complete search history.

(56) References Cited

U.S. PATENT DOCUMENTS 4,959,652 A    9/1990   Hirama

FOREIGN PATENT DOCUMENTS

| JP | 11-003837 A | 1/1999 |
| JP | 2000-306764 A | 11/2000 |
| JP | 2004-273935 A | 9/2004 |
| JP | 2004-288847 A | 10/2004 |

OTHER PUBLICATIONS

Haruki et al.; "Electronic Component"; U.S. Appl. No. 13/420,688, filed Mar. 15, 2012.

*Primary Examiner* — Eric Thomas
*Assistant Examiner* — Arun Ramaswamy
(74) *Attorney, Agent, or Firm* — Keating & Bennett, LLP

(57) ABSTRACT

An electronic component includes an electronic component body and metal terminals. The electronic component body includes a base member and external electrodes. The base member includes two opposed end surfaces, two opposed side surfaces, and two opposed principal surfaces. The external electrodes are disposed on the end surfaces of the base member. The metal terminals are connected to the external electrodes by bonding with solder. A relationship of about $21 \leq V_c/V_h \leq$ about 320 is satisfied where $V_c$ is a volume of the electronic component body and $V_h$ is a volume of the solder provided at one of the pairs of the external electrodes and the metal terminals.

4 Claims, 11 Drawing Sheets

ELECTRONIC COMPONENT

BACKGROUND OF THE INVENTION

1. Field of the Invention

The present invention relates to electronic components. In particular, the present invention relates to an electronic component such as a monolithic ceramic capacitor.

2. Description of the Related Art

In recent years, a reduction in size and an increase in functionality of electronic devices has rapidly progressed. Electronic components mounted on the electronic devices are also desired to be reduced in size. For example, a monolithic ceramic capacitor having a large electrostatic capacity is commercially produced as an alternative to an aluminum electrolytic capacitor because of the progress of a thin-layer technique and a multi-layer technique.

Referring to FIG. 10, a monolithic ceramic capacitor 1 includes a base member 4 in which a plurality of ceramic layers 2 and a plurality of internal electrodes 3 are alternately stacked. Adjacent internal electrodes 3 of the plurality of internal electrodes 3 are alternately led to opposed end surfaces of the base member 4. External electrodes 5 are formed on the end surfaces of the base member 4 to which the internal electrodes 3 are led. The external electrodes 5 are electrically connected to the internal electrodes 3. With this configuration, an electrostatic capacity is formed between the external electrodes 5 provided at the opposed end portions of the base member 4. The monolithic ceramic capacitor 1 is attached to a substrate 7 with solder 6. At this time, the external electrodes 5 of the monolithic ceramic capacitor 1 are attached to the substrate 7 with the solder 6.

The material of the ceramic layers 2 of the monolithic ceramic capacitor 1 is typically a ferroelectric material such as barium titanate with a relatively high dielectric constant. However, the ferroelectric material has piezoelectricity and electrostriction. If an alternating voltage is applied to the monolithic ceramic capacitor 1, a mechanical strain is generated at the ceramic layers 2. If vibration caused by the strain is transmitted to the substrate 7 through the external electrodes 5, the entire substrate 7 may serve as an acoustic radiation surface and hence generate vibration sound such as noise or chatter.

To address this, a configuration as shown in FIG. 11 is suggested, in which a pair of metal terminals 8 are connected to the external electrodes 5 of the monolithic ceramic capacitor 1 with solder and the metal terminals 8 are connected to the substrate 7 by soldering such that the a gap is provided between the substrate 7 and the monolithic ceramic capacitor 1. With this configuration, elastic deformation of the metal terminals 8 can absorb the mechanical strain, which is generated at the ceramic layers when the alternating voltage is applied, restrict transmission of the vibration to the substrate through the external electrodes, and hence reduce generation of the noise (see Japanese Unexamined Patent Application Publication No. 2004-288847, FIG. 21).

However, even when the configuration in which the monolithic ceramic capacitor is attached to the substrate by using the metal terminals is used, an effect of sufficiently restricting the vibration sound of the substrate is not attained.

SUMMARY OF THE INVENTION

Accordingly, preferred embodiments of the present invention provide an electronic component that can provide an effect of sufficiently preventing and suppressing vibration sound even when the electronic component is attached to a substrate.

According to a preferred embodiment of the present invention, an electronic component includes an electronic component body and metal terminals. The electronic component body includes a base member and external electrodes. The base member includes two opposed end surfaces, two opposed side surfaces, and two opposed principal surfaces. The external electrodes are disposed on the end surfaces of the base member. The metal terminals are connected to the external electrodes by solder. A relationship of about $21 \leq Vc/Vh \leq $ about $320$ is satisfied where Vc is a volume of the electronic component body and Vh is a volume of the solder provided at one of the pairs of the external electrodes and the metal terminals.

With such an electronic component, the volume Vh of the solder provided at one of the pairs of the external electrodes and the metal terminals is defined by the average value of the volumes of the solder at the two end surfaces of the electronic component body.

If the volume of the solder adhering to the metal terminals increases, the increase in volume of the solder provides an effect similar to that of the thickness of the terminals increasing at the portions with the solder. Accordingly, rigidity of the terminals increases. If the rigidity of the terminals increases, deformation generated at the electronic component body is hardly absorbed by the metal terminals. The deformation of the electronic component body is transmitted to the substrate, and vibration sound of the substrate increases. In contrast, if the volume of the solder adhering to the metal terminals decreases, the decrease in volume of the solder provides an effect similar to that the thickness of the terminals decreases at the portions with the solder. Accordingly, the rigidity of the terminals decreases. If the rigidity of the terminals decreases, the deformation generated at the electronic component body is likely to be absorbed by the metal terminals. The deformation of the electronic component body is hardly transmitted to the substrate, and the vibration sound of the substrate decreases.

The relationship between the volume Vc of the electronic component body and the volume Vh of the solder provided at one of the pairs of the external electrodes and the metal terminals was checked. As the result, it was discovered that the vibration sound of the substrate can be properly restricted if the ratio of Vc/Vh is about 21 or larger, for example.

It is to be noted that the smaller the volume of the solder, the higher the effect of preventing or suppressing the vibration sound of the substrate; however, the lower the fixing intensity between the external electrodes and the metal terminals. In order to obtain a sufficient fixing intensity between the external electrodes and the metal terminals, Vc/Vh is preferably about 320 or smaller.

With preferred embodiments of the present invention, the electronic component can be provided, in which the deformation generated at the electronic component body is hardly transmitted to the substrate, which can prevent or suppress the vibration sound of the substrate, and which has sufficient fixing intensity between the external electrodes of the electronic component body and the metal terminals.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
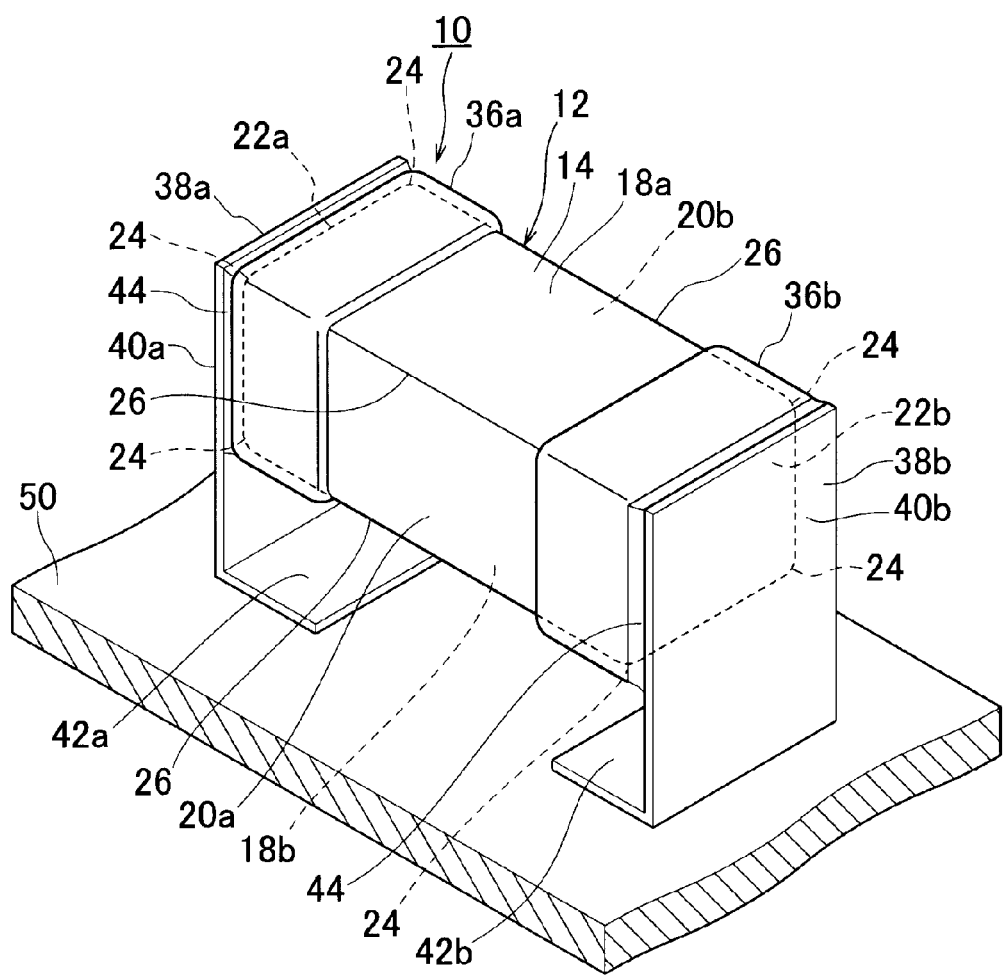
FIG. 1 is a perspective view showing an example of an electronic component according to a preferred embodiment of the present invention.
Figure 2:
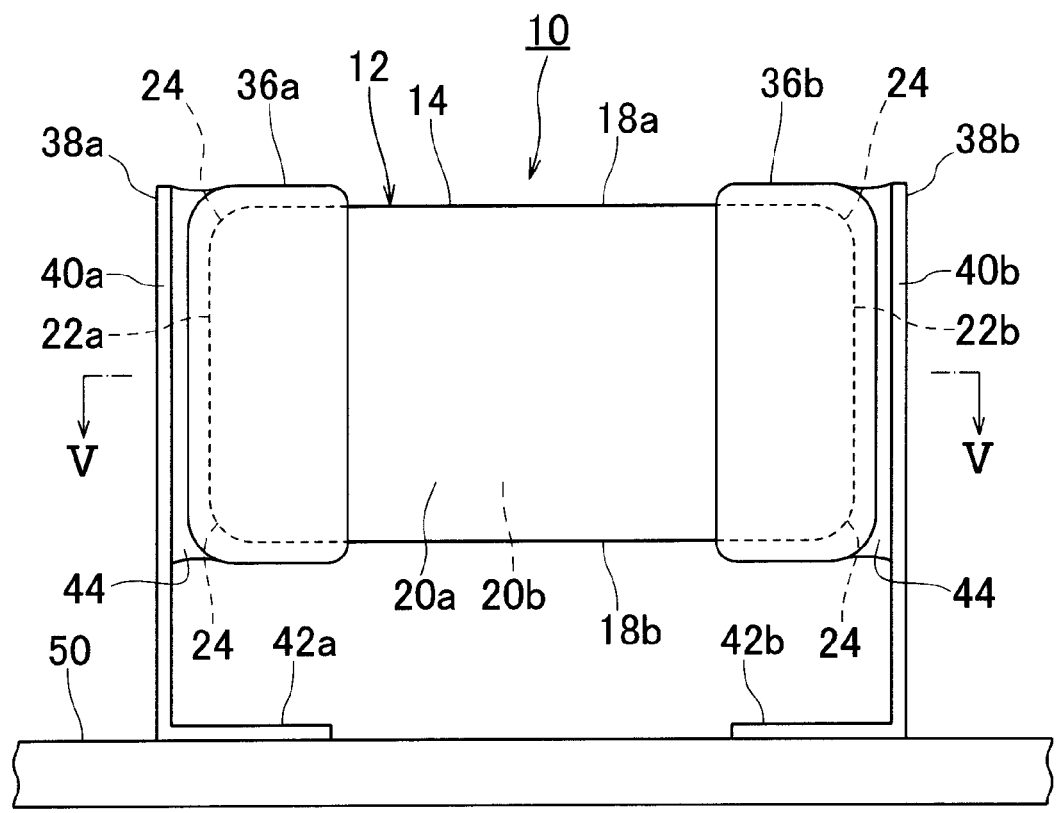
FIG. 2 is a front view of the electronic component shown in FIG. 1.
Figure 3:
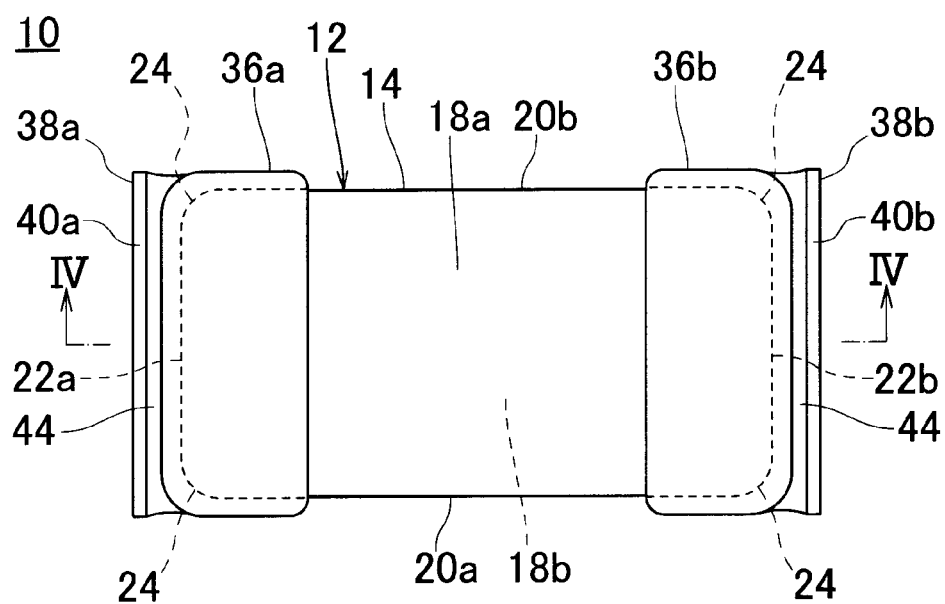
FIG. 3 is a top view of the electronic component shown in FIG. 1.
Figure 4:
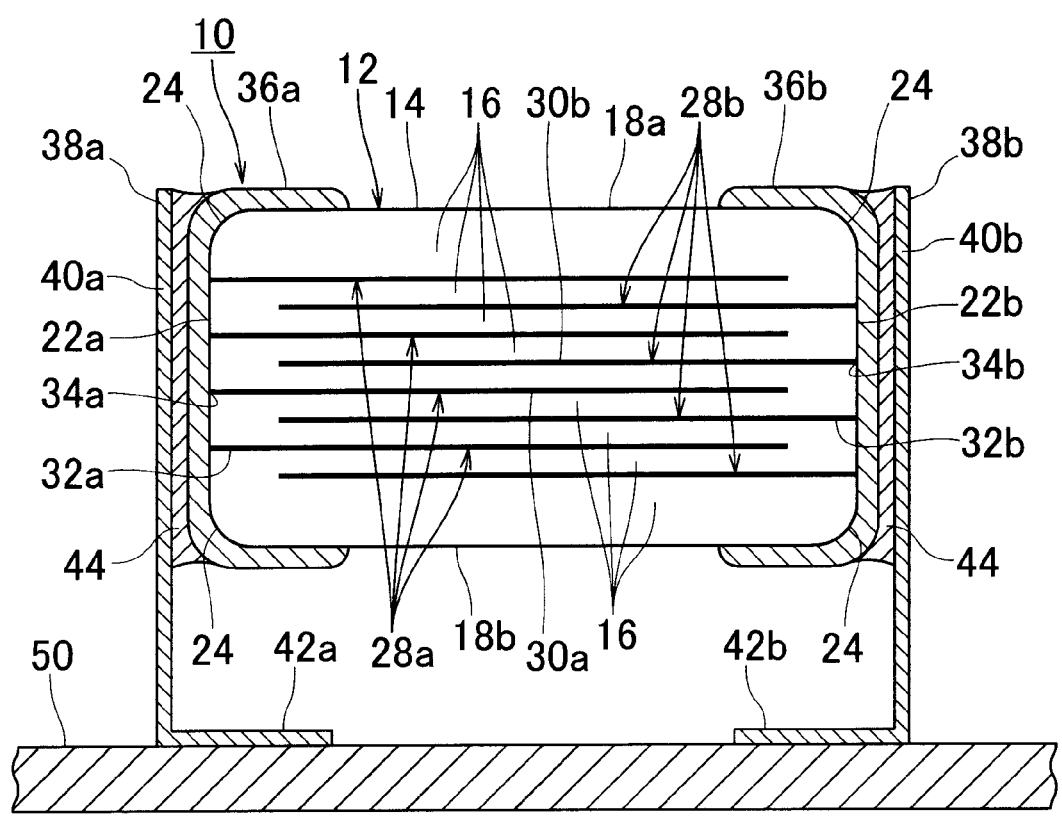
FIG. 4 is a cross-sectional view taken along line IV-IV in FIG. 3.
Figure 5:
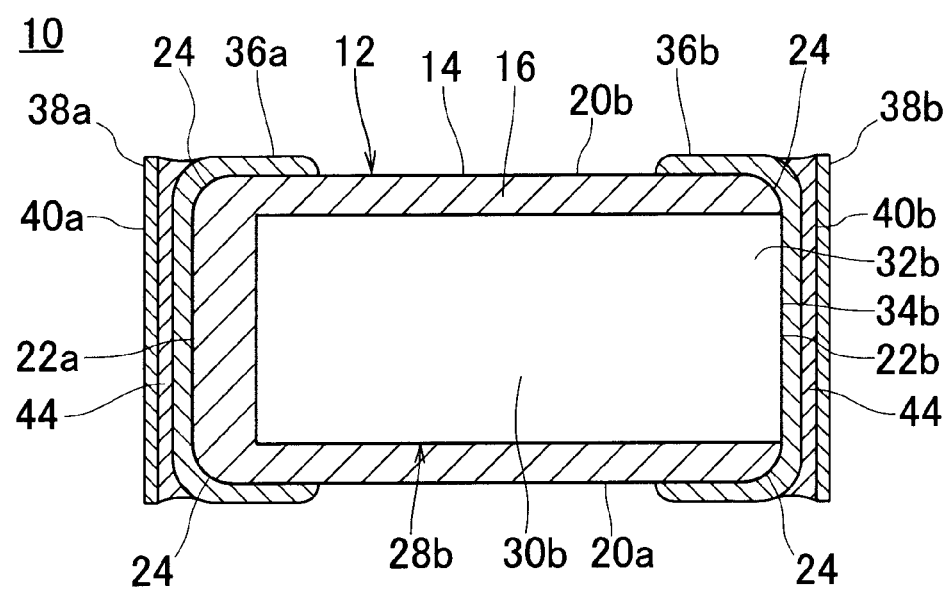
FIG. 5 is a cross-sectional view taken along line V-V in FIG. 2.

FIG. 1 is a perspective view showing an example of an electronic component according to a preferred embodiment of the present invention. FIG. 2 is a front view and FIG. 3 is a top view of the electronic component. Also, FIG. 4 is a cross-sectional view taken along line IV-IV in FIG. 3. FIG. 5 is a cross-sectional view taken along line V-V in FIG. 2.

An electronic component 10 includes an electronic component body 12. The electronic component body 12 includes a base member 14 having, for example, a substantially rectangular-parallelepiped shape. An electronic component such as a monolithic ceramic capacitor is described as an example of the electronic component body 12.

The base member 14 includes a plurality of stacked ceramic layers 16. The base member 14 includes opposed first principal surface 18a and second principal surface 18b, opposed first side surface 20a and second side surface 20b, and opposed first end surface 22a and second end surface 22b. Corner portions 24 and ridge portions 26 of the base member 14 are preferably rounded.

The ceramic material of the ceramic layers 16 included in the base member 14 may preferably be, for example, dielectric ceramic containing $BaTiO_3$, $CaTiO_3$, $SrTiO_3$, and $CaZrO_3$ as the main constituents. Alternatively, the ceramic material of the ceramic layers 16 may preferably be a material in which an accessory constituent, such as a Mn compound, a Mg compound, a Si compound, a Co compound, a Ni compound, or a rare earth compound, is added to these main constituents, for example. The thickness of each of the ceramic layers 16 of the base member 14 is preferably in a range from about 0.5 μm to about 10 μm.

In the base member 14, a plurality of first internal electrodes 28a and a plurality of second internal electrodes 28b are alternately arranged between the ceramic layers 16. The material of the first internal electrodes 28a and second internal electrodes 28b may preferably be, for example, Cu, Ni, Ag, Pd, a Ag—Pd alloy, or Au, for example. The thickness of each of the first internal electrodes 28a or the thickness of each of the second internal electrodes 28b is preferably in a range from about 0.3 μm to about 2.0 μm, for example.

The first internal electrodes 28a include a first facing portion 30a, a first lead portion 32a, and a first exposed portion 34a. The first facing portion 30a faces the second internal electrodes 28b. The first lead portion 32a is led from the first facing portion 30a to the first end surface 22a of the base member 14. The first exposed portion 34a is exposed to the first end surface 22a of the base member 14.

Similarly to the first internal electrodes 28a, the second internal electrodes 28b include a second facing portion 30b that faces the first internal electrodes 28a, a second lead portion 32b that is led from the second facing portion 30b to the second end surface 22b of the base member 14, and a second exposed portion 34b that is exposed to the second end surface 22b of the base member 14.

A first external electrode 36a and a second external electrode 36b are arranged on the external surface of the base member 14. The first external electrode 36a is arranged so as to cover the first end surface 22a of the base member 14 and to partly surround the first and second principal surfaces 18a and 18b and the first and second side surfaces 20a and 20b. The first external electrode 36a is connected to the first exposed portion 34a of the first internal electrode 28a at the first end surface 22a of the base member 14. Similarly, the second external electrode 36b is arranged so as to cover the second end surface 22b of the base member 14 and to partly surround the first and second principal surfaces 18a and 18b and the first and second side surfaces 20a and 20b. The second external electrode 36b is connected to the second exposed portion 34b of the second internal electrode 28b at the second end surface 22b of the base member 14.

The material of the first external electrode 36a and second external electrode 36b may preferably be, for example, Cu, Ni, Ag, Pd, a Ag—Pd alloy, or Au, for example. In particular, the material may be preferably Cu, for example. The thickness of the first external electrode 36a or the thickness of the second external electrode 36b is preferably in a range from about 10 μm to about 80 μm, for example.

A first metal terminal 38a is attached to the first external electrode 36a of the electronic component body 12 by solder. Also, a second metal terminal 38b is attached to the second external electrode 36b of the electronic component body 12 by solder. The first metal terminal 38a has a shape in which a first connection portion 40a that is connected to the first external electrode 36a and a second connection portion 42a that is connected to a substrate (described later) are arranged in a substantially L-shaped configuration. The width of the first metal terminal 38a is preferably the same as the length in the longitudinal direction of a portion of the first external electrode 36a, the portion which covers the first end surface 22a of the base member 14. Also, the length of the first metal terminal 38a is preferably larger than the length in the short-side direction of the portion of the first external electrode 36a, the portion which covers the first end surface 22a of the base member 14. The first connection portion 40a of the first metal terminal 38a is connected to the first external electrode 36a with solder 44 so that the first principal surface 18a of the base member 14 is arranged along an end portion of the first external electrode 36a. Hence, the first metal terminal 38a is connected to the first external electrode 36a such that the portion of the first external electrode 36a on the first end surface 22a of the base member 14 is covered with the first metal terminal 38a.

The second metal terminal 38b preferably has a similar configuration to that of first metal terminal 38a. A first connection portion 40b of the second metal terminal 38b is connected to the second external electrode 36b with solder 44. It is to be noted that the second connection portion 42a of the first metal terminal 38a and a second connection portion 42b of the second metal terminal 38b are preferably arranged to extend inward of the electronic component body 12.

The metal terminals 38a and 38b preferably include a plated film disposed on the surfaces of metal terminal bodies. The terminal bodies are preferably formed of, for example, Ni, Fe, Cu, Ag, or Cr, or an alloy containing at least one of these metals as the main constituent. In particular, the terminal bodies are preferably formed of Ni, Fe, or Cr, or an alloy containing at least one of these metals as the main constituent, for example. To be more specific, the terminal bodies preferably use a Fe-42Ni alloy or a Fe-18Cr alloy as the base material, for example. The thickness of each of the terminal bodies is preferably in a range from about 0.05 mm to about 0.5 mm.

The plated film includes, for example, a lower-layer plated film that covers the terminal bodies, and an upper-layer plated film that covers the lower-layer plated film. Each of the lower-layer plated film and upper-layer plated film may include a plurality of plated films.

The lower-layer plated film is preferably formed of, for example, Ni, Fe, Cu, Ag, or Cr, or an alloy containing at least one of these metals as the main constituent. In particular, the lower-layer plated film is preferably formed of Ni, Fe, or Cr, or an alloy containing at least one of these metals as the main constituent, for example. The thickness of the lower-layer plated film is preferably in a range from about 1.0 μm to about 5.0 μm, for example. Since each of the terminal bodies and the lower-layer plated film is preferably formed of Ni, Fe, or Cr with a high melting point, or an alloy containing at least one of these metals as the main constituent, heat resistance of the external electrodes 36a and 36b can be improved.

The upper-layer plated film is preferably formed of, for example, Sn, Ag, or Au, or an alloy containing at least one of these metals as the main constituent. In particular, the upper-layer plated film is preferably formed of Sn or an alloy containing Sn as the main constituent, for example. The thickness of the upper-layer plated film is preferably in a range from about 1.0 μm to about 5.0 μm, for example. Since the upper-layer plated film is preferably formed of Sn or an alloy containing Sn as the main constituent, solderability between the metal terminals 38a and 38b and the external electrodes 36a and 36b can be improved.

The solder 44 may be, for example, LF solder, such as Sn—Sb solder, Sn—Ag—Cu solder, Sn—Cu solder, or Sn—Bi solder. In particular, if Sn—Sb solder is used, the content rate of Sb is preferably in a range from about 5% to about 15%, for example.

With this electronic component 10, when Vc is the volume of the electronic component body 12 and Vh is the volume of the solder 44 provided at one of the pair of the external electrode 36a and the metal terminal 38a and the pair of the external electrode 36b and the metal terminal 38b, the volumes Vc and Vh are preferably determined to satisfy the relationship of about $21 \leq Vc/Vh \leq$ about 320. The volume Vh of the solder 44 is a value indicated by an average value of the volumes of the solder 44 provided at the two opposed end surfaces of the electronic component body 12.

Next, a non-limiting example of a method of manufacturing the monolithic ceramic capacitor as the electronic component body 12 is described.

First, ceramic green sheets, internal-electrode conductive paste, and external-electrode conductive paste are prepared. The ceramic green sheets and the conductive paste contain binders and solvents, which may be known organic binders and organic solvents.

Then, the internal-electrode conductive paste is printed on a ceramic green sheet with a predetermined pattern, for example, by screen printing. Thus, an internal-electrode pattern is formed.

Then, a predetermined number of external-layer ceramic green sheets without the internal-electrode patterns printed thereon are stacked, ceramic green sheets with the internal-electrode patterns printed thereon are successively stacked on the external-layer ceramic green sheets, and a predetermined number of the external-layer ceramic green sheets are stacked on the ceramic green sheets with the internal-electrode patterns. Thus, a mother stack is fabricated.

Then, the mother stack is pressed in the stack direction, for example, by pressing with a hydrostatic pressure.

Then, the pressed mother stack is cut into pieces with a predetermined size to obtain a pre-firing ceramic stack. At this time, corner portions and ridge portions of the pre-firing ceramic stack may be rounded, for example, by barrel grinding.

Then, the pre-firing ceramic stack is fired. In this case, the firing temperature is preferably in a range from about 900° C. to about 1300° C., for example, although the firing temperature depends on the materials of the substrate and internal electrodes. The fired ceramic stack serves as the base member 14, the first internal electrodes 28a, and the second internal electrodes 28b of the monolithic ceramic capacitor.

The external-electrode conductive paste is applied to the first and second end surfaces of the fired ceramic stack and the paste is baked. Thus, the external electrodes 36a and 36b are formed. The baking temperature is preferably in a range from about 700° C. to about 900° C., for example. It is to be noted that baking of the external-electrode conductive paste and firing of the pre-firing ceramic stack are performed, for example, in the air atmosphere, $N_2$ atmosphere, or moist $N_2$ atmosphere.

The first and second metal terminals 38a and 38b are connected to the external electrodes 36a and 36b of the monolithic ceramic capacitor obtained as described above, by using the solder 44. At this time, the metal terminals 38a and 38b are connected to the monolithic ceramic capacitor, for example, by reflow soldering. The soldering temperature is in a range from about 270° C. to about 290° C. and the heat is applied for about 30 seconds or longer, for example.

The electronic component 10 thus obtained is mounted on a substrate 50. At this time, the second connection portion 42a of the first metal terminal 38a and the second connection portion 42b of the second metal terminal 38b are soldered to the substrate 50. Since the lengths of the first connection portions 40a and 40b of the metal terminals 38a and 38b are larger than the lengths in the short-side direction of the external electrodes 36a and 36b, the electronic component body 12 is attached to the substrate 50 such that the electronic component body 12 is elevated from or raised off of the surface of the substrate 50.

When an alternating voltage is applied to the electronic component 10, a mechanical strain is generated at the ceramic layers 16. However, since the electronic component body 12 is supported by the metal terminals 38a and 38b such that the electronic component body 12 is elevated from or raised off of the surface of the substrate 50, elastic deformation of the metal terminals 38a and 38b absorbs deformation generated at the electronic component body 12.

However, if the volume of the solder 44 increases, the rigidity of the terminals relatively increases. As a result, the metal terminals 38a and 38b are hardly bent, and the deformation generated at the electronic component body 12 is hardly absorbed. Hence, the deformation generated at the electronic component body 12 is likely transmitted to the substrate 50, and vibration sound of the substrate 50 increases.

In contrast, if the volume of the solder 44 decreases, the rigidity of the terminals relatively decreases. As a result, the metal terminals 38a and 38b are easily bent, and the deformation generated at the electronic component body 12 is likely absorbed. Hence, the deformation generated at the electronic component body 12 is hardly transmitted to the substrate 50, and the vibration sound of the substrate 50 decreases. If the volume of the solder 44 is excessively small, the fixing intensity between the metal terminals 38a and 38b and the external electrodes 36a and 36b decreases.

With this electronic component 10 according to the preferred embodiments of the present invention, when Vc is the volume of the electronic component body 12 and Vh is the volume of the solder 44 provided at one of the pair of the external electrode 36a and the metal terminal 38a and the pair of external electrode 36b and the metal terminal 38b, the volumes Vc and Vh are determined to satisfy the relationship of about 21≤Vc/Vh≤about 320, for example. The volume Vh of the solder 44 provided at one of the pair of the external electrode 36a and the metal terminal 38a and the pair of the external electrode 36b and the metal terminal 38b is a value indicated by the average value of the volumes of the solder 44 provided at the two opposed end surfaces 22a and 22b of the electronic component body 12. If the value of Vc/Vh is about 21 or larger, the deformation generated at the electronic component body 12 can be properly absorbed. If Vc/Vh is about 320 or smaller, the ratio of the volume of the solder 44 with respect to the electronic component body 12 increases, and the fixing intensity between the metal terminals 38a and 38b and the external electrodes 36a and 36b can sufficiently increase.

EXAMPLE 1

Electronic component bodies 12 (monolithic ceramic capacitors) with an approximate chip size of 3.2 (±0.2) mm×1.6 (±0.2) mm×1.6 (±0.2) mm (±0.2 is a manufacturing tolerance) and a capacity of about 10 μF were prepared, and electronic components 10 of samples 1 to 9 were fabricated as shown in Table 1 by the above-described manufacturing method. Each of the electronic component bodies 12 was attached to the metal terminals 38a and 38b with Sn—Sb solder containing Sb by about 10%. Then, for each of the electronic components 10, the relationship between the ratio Vc/Vh of the volume Vc of the electronic component body 12 to the volume Vh of the solder 44 provided at one of the pair of the external electrode 36a and the metal terminal 38a and the pair of the external electrode 36b and the metal terminal 38b, and the vibration sound of the substrate 50 was checked. Also, the same electronic component body 12 (the monolithic ceramic capacitor) as those used for the samples 1 to 9 was prepared as a comparative example. The comparative example does not include the metal terminals. The chip size may alternatively be, for example, 1.0 (±0.05) mm×0.5 (±0.05) mm×0.5 (±0.05) mm; 1.6 (±0.1) mm×0.8 (±0.1) mm×0.8 (±0.1) mm; 2.0 (±0.1) mm×1.25 (±0.1) mm×1.25 (±0.1) mm; or 3.2 (±0.3) mm×2.5 (±0.2) mm×2.5 (±0.2) mm.

Figure 6:
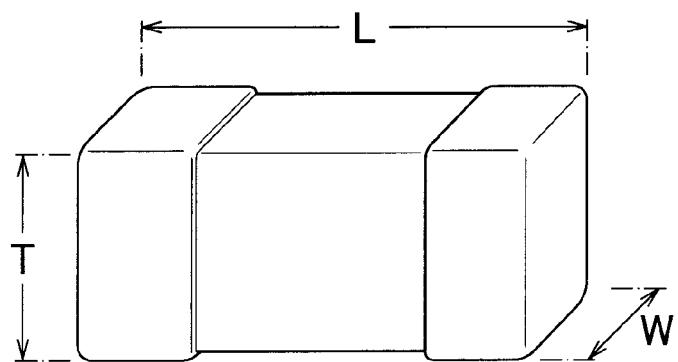
FIG. 6 is an explanatory view showing dimensions of an electronic component body.

First, referring to FIG. 6, to obtain the volume Vc of the electronic component body 12, the length L, width W, and height T of the electronic component body 12 including the external electrodes 36a and 36b were measured by a micrometer, and it was ensured that the size falls within the dimensional range of standard dimensions+manufacturing tolerances. The size in the dimensional range of the standard dimensions+the manufacturing tolerances was assumed as the size with the standard dimensions (3.2 mm×1.6 mm×1.6 mm), and the volume Vc of the electronic component body 12 was defined by Vc=L×W×T.

Figure 7:
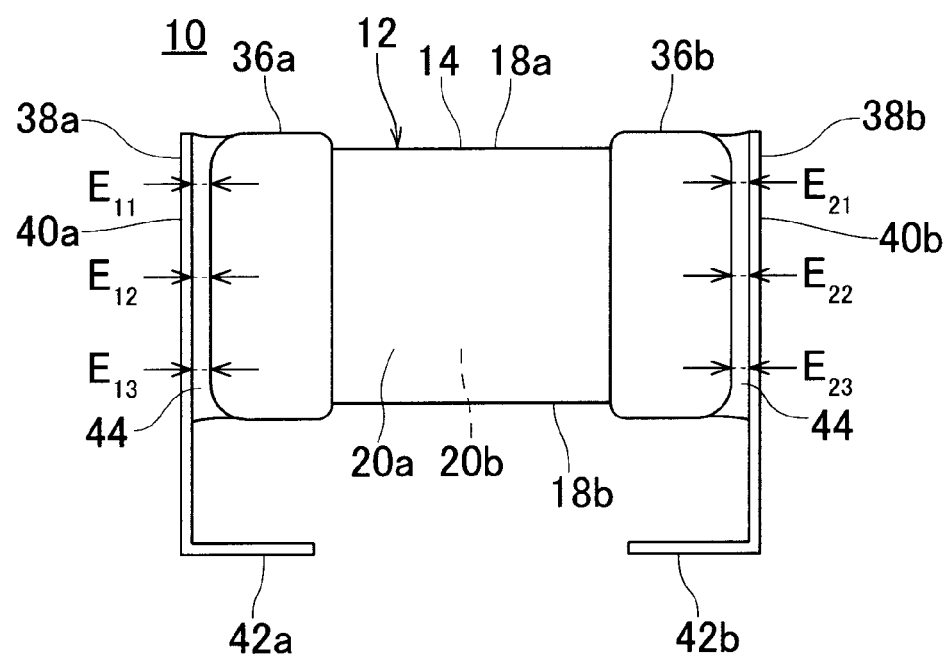
FIG. 7 is an explanatory view showing gaps between external electrodes and metal terminals measured at a plurality of positions for obtaining the volume of solder.

Then, to obtain the volume Vh of the solder 44 provided at one of the pair of the external electrode 36a and the metal terminal 38a and the pair of the external electrode 36b and the metal terminal 38b, an end surface area S was obtained by S=W×T using the width W and the height T of the electronic component body 12. Further, referring to FIG. 7, gaps $E_{11}$, $E_{12}$, and $E_{13}$ at three positions between the first external electrode 36a and the first metal terminal 38a were measured by an optical microscope. The average value of the gaps $E_{11}$, $E_{12}$, and $E_{13}$ at the three positions was determined as a gap $E_1$ between the first external electrode 36a and the first metal terminal 38a. Then, a volume $Vh_1$ of the solder 44 provided between the first external electrode 36a and the first metal terminal 38a was obtained from a product of $Vh_1=S\times E_1$ using the end surface area S of the electronic component body 12 and the gap $E_1$ between the first external electrode 36a and the first metal terminal 38a.

Similarly, gaps $E_{21}$, $E_{22}$, and $E_{23}$ at three positions between the second external electrode 36b and the second metal terminal 38b were measured, and a gap $E_2$ between the second external electrode 36b and the second metal terminal 38b was obtained from the average value of the gaps $E_{21}$, $E_{22}$, and $E_{23}$. Then, a volume $Vh_2$ of the solder 44 between the second external electrode 36b and the second metal terminal 38b was obtained by a product of $Vh_2=S\times E_2$. The average value of the obtained two volumes $Vh_1$ and $Vh_2$ of the solder 44 was obtained, and the average value was determined as the volume Vh of the solder 44 provided at one of the pair of the external electrode 36a and the metal terminal 38a and the pair of the external electrode 36b and the metal terminal 38b.

Figure 8:
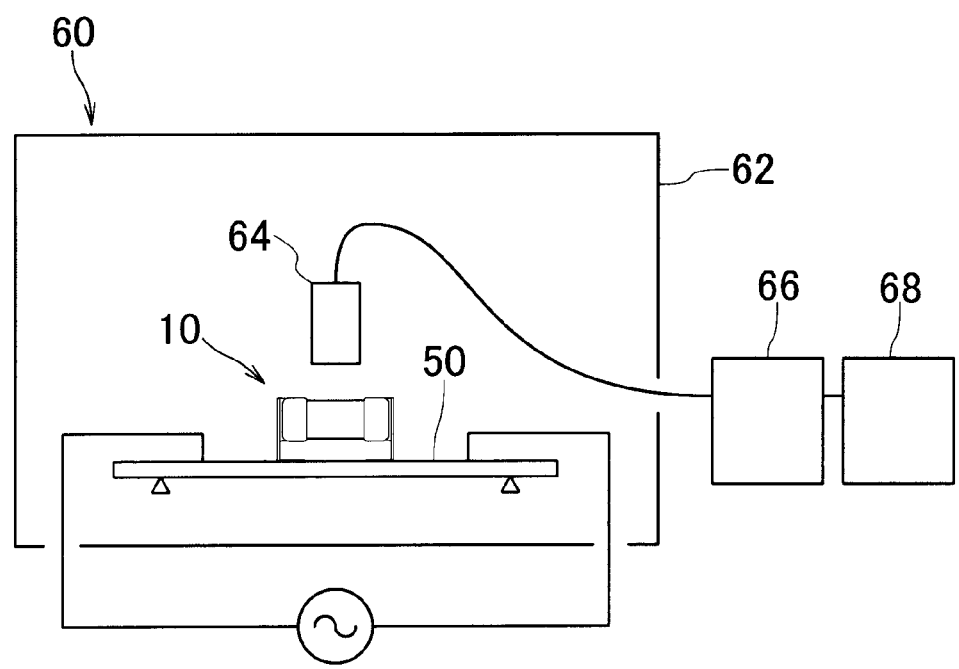
FIG. 8 is an explanatory view showing an example of a device that measures vibration sound of a substrate with the electronic component mounted.

Then, the electronic component 10 was attached to a substrate 50 made of glass epoxy with a thickness of about 1.6 mm, and the vibration sound of the substrate 50 was measured by a device 60 as shown in FIG. 8. In particular, the substrate 50 with the electronic component 10 mounted thereon was arranged in an anechoic chamber 62, and an alternating voltage with a frequency of about 3 kHz and a voltage of about 1 Vpp was applied to the electronic component 10. Then, the vibration sound generated at this time was collected by a sound collector microphone 64, and the sound pressure level of the collected sound was measured by a noise level meter 66 and a FFT analyzer (CF-5220, manufactured by Ono Sokki Co., Ltd.) 68. The sound collector microphone 64 was arranged at a position separated from the substrate 50 only by a distance of about 3 mm.

The obtained results are shown in Table 1. Table 1 shows the relationship between Vc/Vh and the substrate vibration sound pressure level, and also shows the sound pressure level ratio of the vibration sound pressure level to that in a case in which the metal terminals were not provided and the external electrodes 36a and 36b of the electronic component body 12 were directly soldered to the substrate 50.

TABLE 1

|  | Solder thickness (μm) | Vc/Vh | Substrate vibration sound pressure level (dB) | Sound pressure level ratio (%) |
|---|---|---|---|---|
| Sample 1 | 200 | 16 | 52.2 | 66.9 |
| Sample 2 | 175 | 18 | 51.5 | 66.0 |
| Sample 3 | 150 | 21 | 46.8 | 59.9 |
| Sample 4 | 125 | 26 | 46.6 | 59.8 |

TABLE 1-continued

|  | Solder thickness (μm) | Vc/Vh | Substrate vibration sound pressure level (dB) | Sound pressure level ratio (%) |
|---|---|---|---|---|
| Sample 5 | 100 | 32 | 45.8 | 58.7 |
| Sample 6 | 70 | 46 | 42.3 | 54.2 |
| Sample 7 | 30 | 64 | 40.2 | 51.6 |
| Sample 8 | 25 | 128 | 38.0 | 48.8 |
| Sample 9 | 10 | 320 | 36.3 | 46.5 |
| Comparative example | — | — | 78.0 | 100.0 |

As is seen from Table 1, if Vc/Vh is about 21 or larger, the substrate vibration sound pressure level can be decreased by about 40% or more as compared with the electronic component without the metal terminals.

Figure 9:
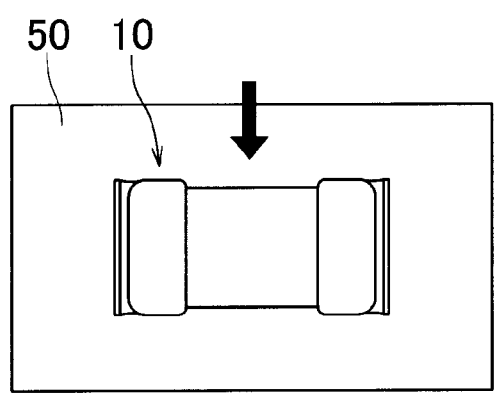
FIG. 9 is an explanatory view showing a method of measuring a fixing intensity between the electronic component and the metal terminals.
Figure 10:
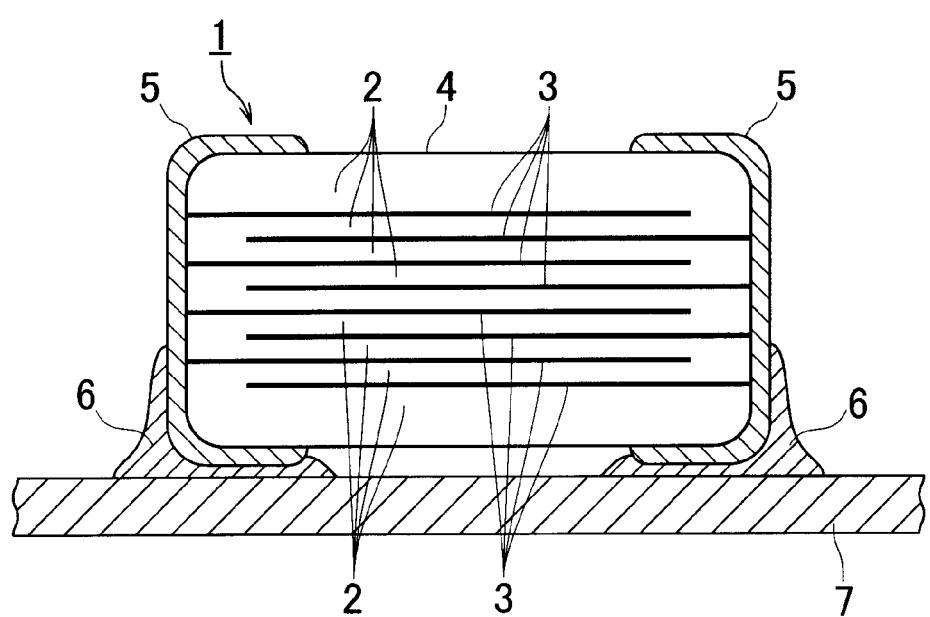
FIG. 10 is an explanatory view showing a state in which an electronic component of related art is mounted on a substrate.
Figure 11:
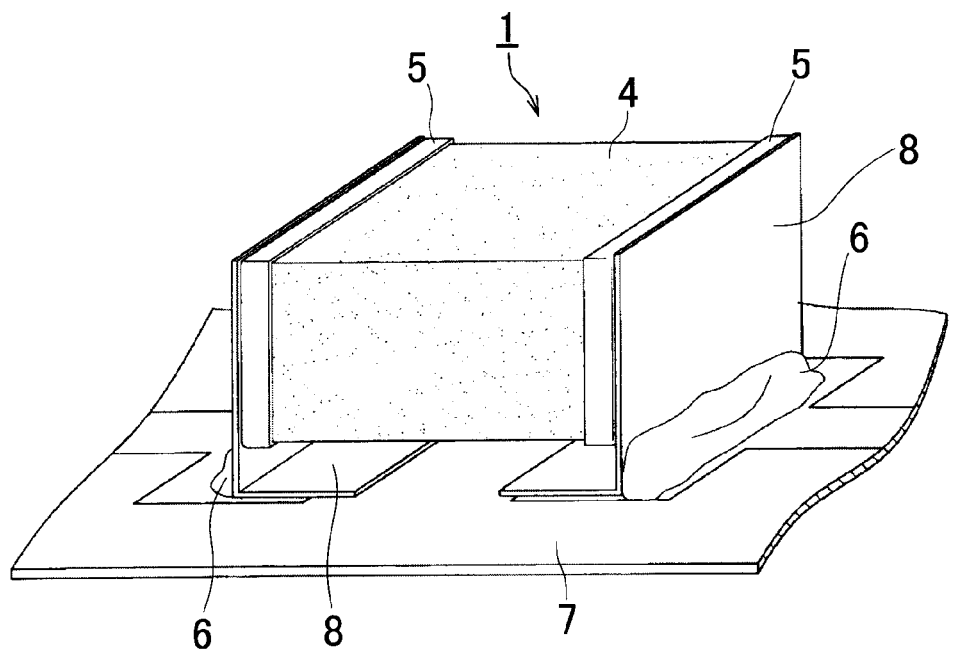
FIG. 11 is a perspective view showing an electronic component of related art suggested for addressing a problem of the electronic component shown in FIG. 10.

Also, referring to FIG. 9, the electronic component body 12 was attached to the substrate 50 by soldering, a processing jig was pressed to a side surface of the electronic component body 12 with a force of about 0.5 mm/s, and the fixing intensity between the external electrodes 36a and 36b and the metal terminals 38a and 38b was checked. As the result, if Vc/Vh was about 320 or smaller, the fixing intensity of about 30 N or larger could be obtained.

While preferred embodiments of the present invention have been described above, it is to be understood that variations and modifications will be apparent to those skilled in the art without departing from the scope and spirit of the invention. The scope of the present invention, therefore, is to be determined solely by the following claims.

What is claimed is:

1. A monolithic ceramic capacitor comprising:
an electronic component body including:
a base member including:
two opposed end surfaces;
two opposed side surfaces; and
two opposed principal surfaces; and
external electrodes disposed on the two opposed end surfaces of the base member; and
metal terminals that are connected to the external electrodes by solder; wherein
a relationship of about $21 \leq Vc/Vh \leq$ about 320 is satisfied where Vc is a volume of the electronic component body and Vh is a volume of the solder provided at one of the pairs of the external electrodes and the metal terminals.

2. The monolithic ceramic capacitor according to claim 1, wherein the volume Vh of the solder provided at one of the pairs of the external electrodes and the metal terminals is defined by the average value of the volumes of the solder at the two end surfaces of the electronic component body.

3. The monolithic ceramic capacitor according to claim 1, wherein the solder is Sn—Sb solder and a content rate of Sb is in a range from about 5% and about 15%.

4. The monolithic ceramic capacitor according to claim 1, wherein the solder is located on portions of the external electrodes disposed on the two opposed end surfaces of the base member and the solder does not extend to any of the opposed side surfaces and the opposed principal surfaces of the base member or portions of the external electrodes disposed thereon.

* * * * *